(12) United States Patent
Kim et al.

(10) Patent No.: US 8,675,152 B2
(45) Date of Patent: Mar. 18, 2014

(54) METHOD FOR MANUFACTURING LCD DEVICE AND LIGHT GUIDE PANEL

(76) Inventors: Moon Jeong Kim, Seoul (KR); Bang gun Kim, Seoul (KR)

( * ) Notice: Subject to any disclaimer, the term of this patent is extended or adjusted under 35 U.S.C. 154(b) by 573 days.

(21) Appl. No.: 12/921,003

(22) PCT Filed: Jun. 16, 2009

(86) PCT No.: PCT/KR2009/003213
§ 371 (c)(1),
(2), (4) Date: Sep. 3, 2010

(87) PCT Pub. No.: WO2010/055984
PCT Pub. Date: May 20, 2010

(65) Prior Publication Data
US 2011/0012942 A1    Jan. 20, 2011

(30) Foreign Application Priority Data
Nov. 14, 2008   (KR) .................. 10-2008-0113021

(51) Int. Cl.
*G02F 1/13357*    (2006.01)
(52) U.S. Cl.
USPC ........................................................ 349/65
(58) Field of Classification Search
None
See application file for complete search history.

(56) References Cited

U.S. PATENT DOCUMENTS

| | | | |
|---|---|---|---|
| 6,241,358 B1 * | 6/2001 | Higuchi et al. | 362/613 |
| 6,580,477 B1 | 6/2003 | Cho | 349/65 |
| 8,292,447 B2 * | 10/2012 | Lee et al. | 362/97.1 |
| 2001/0017774 A1 * | 8/2001 | Ito et al. | 362/31 |
| 2005/0180124 A1 | 8/2005 | Adachi et al. | 362/30 |
| 2006/0056166 A1 * | 3/2006 | Yeo et al. | 362/19 |
| 2006/0221638 A1 | 10/2006 | Chew et al. | 362/613 |
| 2007/0017774 A1 | 1/2007 | Brinkmeier et al. | 193/35 |
| 2007/0047231 A1 | 3/2007 | Tain | |
| 2008/0101068 A1 * | 5/2008 | Kitamura et al. | 362/246 |
| 2008/0137004 A1 * | 6/2008 | Iwasaki et al. | 349/64 |
| 2008/0231774 A1 * | 9/2008 | Tomita et al. | 349/66 |
| 2009/0284956 A1 * | 11/2009 | Gomi et al. | 362/97.3 |
| 2009/0296026 A1 * | 12/2009 | Bae et al. | 349/65 |
| 2009/0303410 A1 * | 12/2009 | Murata et al. | 349/58 |
| 2010/0026931 A1 * | 2/2010 | Yokoyama | 349/62 |

(Continued)

FOREIGN PATENT DOCUMENTS

| | | |
|---|---|---|
| JP | 11-288611 A | 10/1999 |
| JP | 2006-236701 A | 9/2006 |

(Continued)

OTHER PUBLICATIONS

European Search Report dated Apr. 11, 2012 issued in Application No. 09 82 6217.

(Continued)

*Primary Examiner* — Mike Stahl
(74) *Attorney, Agent, or Firm* — KED & Associates LLP (57) ABSTRACT

Provided is a liquid crystal display device. The liquid crystal display device comprises a liquid crystal panel, a backlight unit, and a driving unit. The liquid crystal panel comprises a plurality of display areas defined therein. The backlight unit is disposed under the liquid crystal panel. The backlight unit comprises a plurality of light emitting areas corresponding to the respective display areas defined therein. The driving unit controls intensity of light emitted from the light emitting areas. Here, the backlight unit comprises light guide plates disposed in two or more light emitting areas.

19 Claims, 10 Drawing Sheets

(56) References Cited

U.S. PATENT DOCUMENTS

| | | | |
|---|---|---|---|
| 2010/0182541 A1* | 7/2010 | Ouchi et al. | 349/65 |
| 2010/0296026 A1* | 11/2010 | Kubota et al. | 349/62 |
| 2011/0025730 A1* | 2/2011 | Ajichi | 345/690 |
| 2011/0304796 A1* | 12/2011 | Lee et al. | 349/62 |

FOREIGN PATENT DOCUMENTS

| | | |
|---|---|---|
| JP | 2006-236771 | 9/2006 |
| JP | 2006-236771 A | 9/2006 |
| JP | 2007-213951 | 8/2007 |
| JP | 2007-293339 A | 11/2007 |
| JP | 2007-326331 | 12/2007 |
| JP | 2008-192385 | 8/2008 |
| KR | 10-2006-0125069 A | 12/2006 |
| KR | 10-2007-0001657 A | 1/2007 |
| KR | 10-2007-0040009 A | 4/2007 |
| KR | 10-2007-0096336 A | 10/2007 |
| WO | WO 2005/024478 A1 | 3/2005 |

OTHER PUBLICATIONS

PCT International Search Report dated Jan. 21, 2010 issued in Application No. PCT/KR2009/003213.

Japanese Office Action dated Dec. 10, 2013 for Application 2011-536210.

* cited by examiner

METHOD FOR MANUFACTURING LCD DEVICE AND LIGHT GUIDE PANEL

TECHNICAL FIELD

The present disclosure relates to a liquid crystal display device and a method of fabricating a light guide plate.

BACKGROUND ART

With the development of information processing technologies, display devices such as Liquid Crystal Displays (LCDs), Plasma Display Panels (PDPs), and Active-Matrix Organic Light-Emitting Diodes (AMOLEDs) are being widely used. LCDs among these display devices require a backlight unit capable of generating light to display images.

Also, with the trend of large-sizing and large screen of display devices, a backlight unit needs to emit light having high brightness and brightness uniformity.

DISCLOSURE OF THE INVENTION

Technical Problem

Embodiments provides a liquid crystal display device and a method of fabricating a light guide plate in the liquid crystal display device, which has high brightness and improved brightness uniformity, reduces power consumption, and has improved image quality.

Technical Solution

In one embodiment, a liquid crystal display device comprises: a liquid crystal panel comprising a plurality of display areas defined therein; a backlight unit under the liquid crystal panel, the backlight unit comprising a plurality of light emitting areas corresponding to the respective display areas defined therein; and a driving unit controlling intensity of light emitted from the light emitting areas, wherein the backlight unit comprises light guide plates disposed in two or more light emitting areas.

In one embodiment, the backlight unit may comprise a light source disposed in a groove formed on the undersurface of the light guide plate.

In one embodiment, the light guide plates may be formed integrally with each other, and may comprise a plurality of light guide units having a wedge shape.

In one embodiment, the light guide plate may comprise a plurality of incident surfaces extending in a direction crossing the upper surface of the light guide plate.

In one embodiment, the light guide plate may comprise a plurality of inclined surfaces extending from the incident surfaces in a direction inclined with respect to the upper surface of the light guide plate.

In one embodiment, the backlight unit may comprise light sources corresponding to the respective light emitting areas, and emit light in the same direction as the light sources.

In another embodiment, a liquid crystal display device comprises: a liquid crystal panel; a plurality of light guide plates under the liquid crystal panel; and a plurality of light sources emitting light to the light guide plates, wherein at least one of the light guide plates comprises a plurality of light guide units, the light guide units comprise incident surfaces to which the light emitted from the light sources is incident, and the light sources are disposed on the incident surfaces.

In one embodiment, the light guide unit may comprise an inclined surface inclined at a certain angle from the incident surface.

In one embodiment, the light guide unit may comprise at least one of a prism pattern and a scattering pattern.

In one embodiment, the light guide plate may comprise connection portions interposed between the light guide units, respectively, and the light guide units and the connection units may be integrally formed.

In one embodiment, the thickness of the connection portions may be smaller than the thickness of the light guide units.

In one embodiment, the number of the light guide units may be equal to or more than three.

In further another embodiment, a method of fabricating a light guide plate comprises: providing a mold comprising a first groove having a shape extending in a first direction and a second groove extending in the first direction, formed at a side of the first groove, and connected to the first groove; injecting a resin composition in the first direction to inject the resin composition into the first and second grooves; and hardening the injected resin composition.

In one embodiment, the bottom surfaces of the first and second grooves may be inclined with respect to the side surfaces of the first and second grooves.

In one embodiment, the mold may comprise a connection region having a smaller depth than the first and second grooves and connecting between the first and second grooves.

The details of one or more embodiments are set forth in the accompanying drawings and the description below. Other features will be apparent from the description and drawings, and from the claims.

Advantageous Effects

A liquid crystal display device according an embodiment can control the intensity of light emitted from corresponding light emitting areas according to images displayed on display areas, respectively.

When an image requiring a low brightness is displayed on the display areas, the intensity of light emitted from the light emitting areas corresponding thereto can be reduced.

Accordingly, a liquid crystal display device according an embodiment does not consume power to generate unnecessary light, thereby reducing power consumption.

A liquid crystal display device according an embodiment can reduce the intensity of light of a black area, thereby realizing more brilliant black and improved image quality.

Since the light guide plate is disposed in two or more light emitting areas, dark portions that may be generated in the boundary between the light emitting areas can be reduced compared to the case where one light guide plate is disposed in one light emitting area, respectively.

That is, a liquid crystal display device according to an embodiment can reduce brightness non-uniformity generated in a boundary between the light emitting areas.

A liquid crystal display device according to an embodiment can reduce a dark portion generated in a boundary between the light emitting areas, thereby improving overall brightness.

According to a method of fabricating a light guide plate according to an embodiment, the light guide plate having a complicated structure can be formed without defects because a resin composition is injected in the formation direction of a first groove and a second groove.

Particularly, even when the thickness of the light guide plate is very thin, the light guide plate can be delicately formed without being bent.

BEST MODE FOR CARRYING OUT THE INVENTION

Reference will now be made in detail to the embodiments of the present disclosure, examples of which are illustrated in the accompanying drawings.

In the descriptions of embodiments, it will be understood that when a layer (or film), a region, a pattern, or a structure is referred to as being "on/under" a substrate, a layer (or film), a region, a pad, or patterns, it can be directly on the substrate, the layer (or film), the region, the pad, or the patterns, or intervening layers may also be present. Also, Further, the reference about 'on' and 'under' each layer will be made on the basis of the drawings. In the drawings, the dimension of each of elements may be exaggerated for clarity of illustration, and the dimension of each of the elements may be different from the actual dimension of each of the elements.

Hereinafter, a liquid crystal display device and a method of fabricating a light guide plate will be described with reference to the accompanying drawings.

Figure 1:
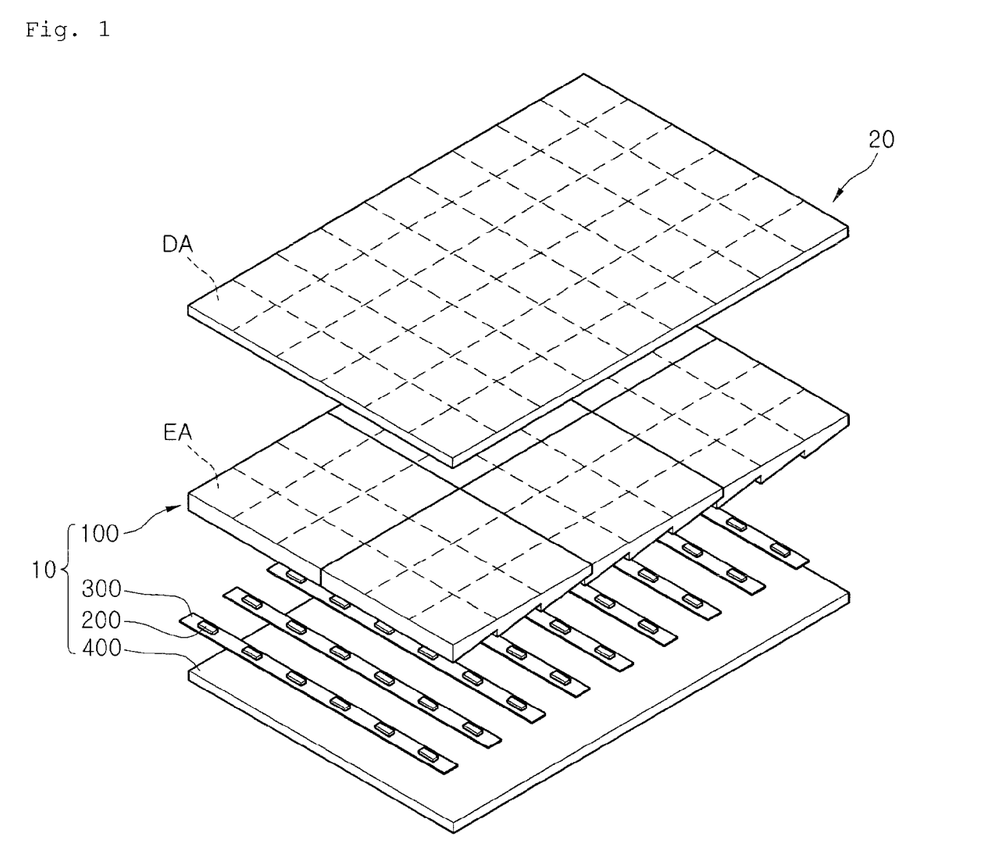
FIG. 1 is an exploded perspective view illustrating a liquid crystal display device according to an embodiment.
Figure 2:
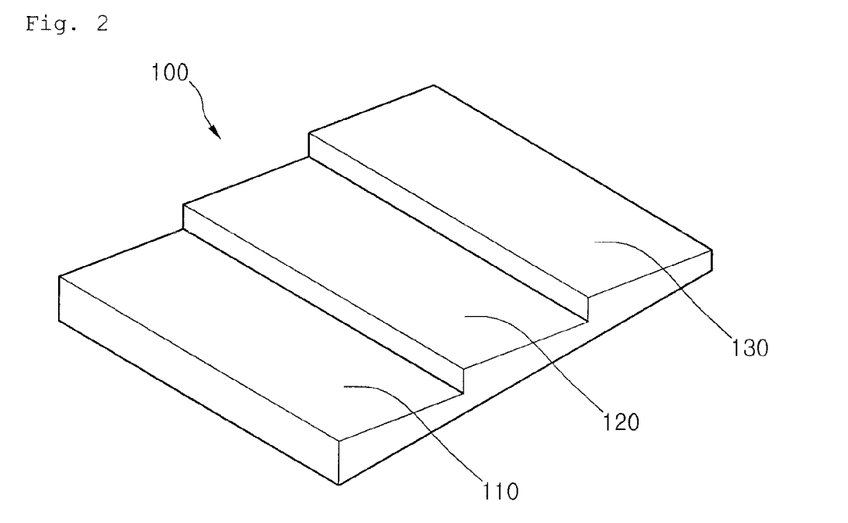
FIG. 2 is a perspective view illustrating a back side of a light guide plate.
Figure 3:
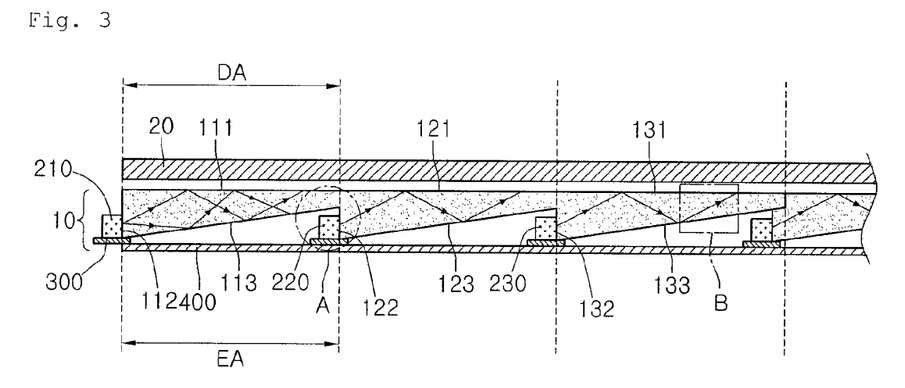
FIG. 3 is a cross-sectional view of a liquid crystal display device according to an embodiment.
Figure 4:
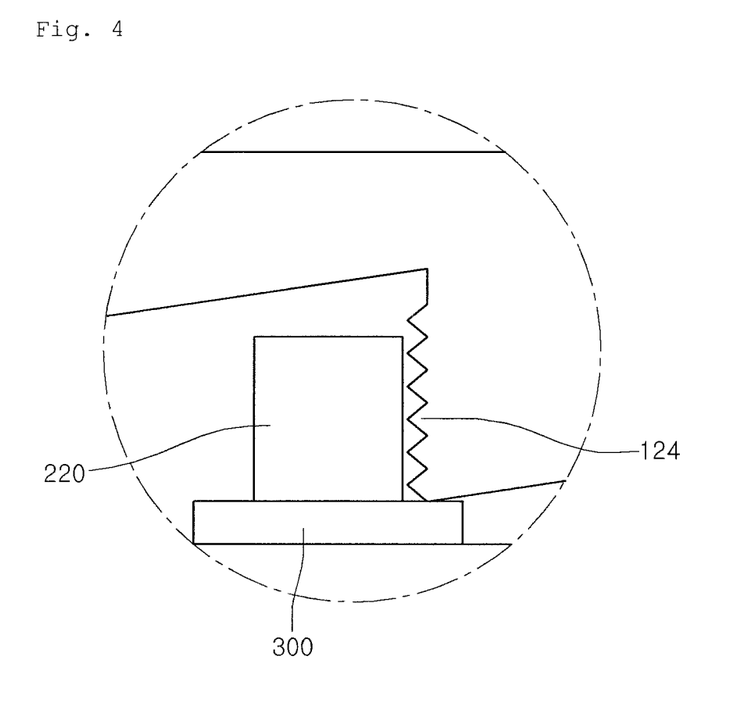
FIG. 4 is a cross-sectional view magnifying part 'A' of FIG. 3.
Figure 5:
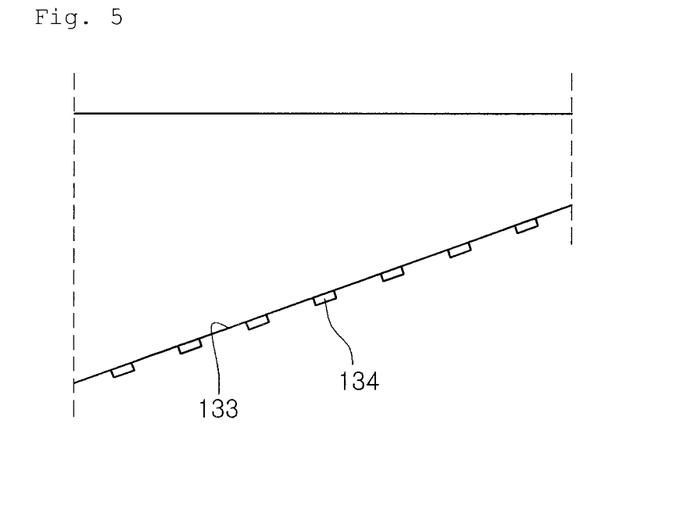
FIG. 5 is a cross-sectional view magnifying part 'B' of FIG. 3.
Figure 6:
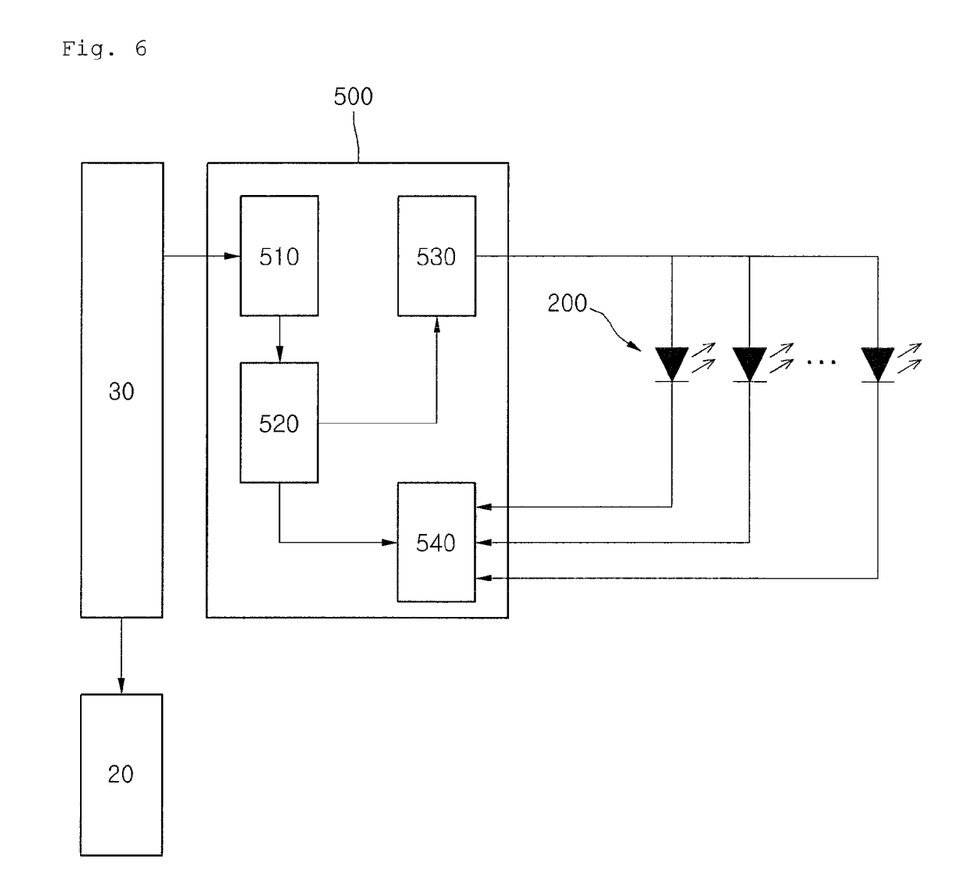
FIG. 6 is a circuit view illustrating a driving unit.
Figure 7:
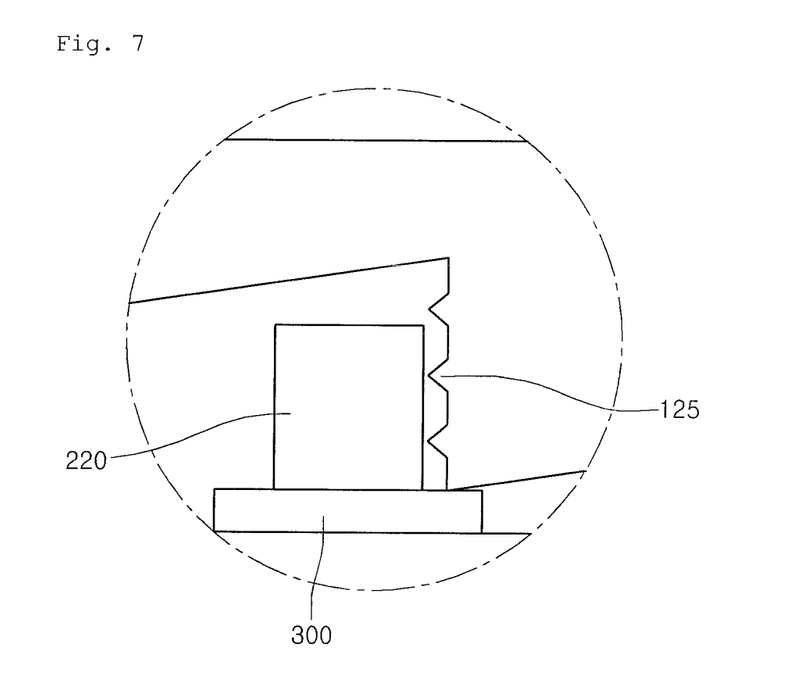
FIGS. 7 and 8 are cross-sectional views illustrating an incident surface according to another embodiment.
Figure 8:
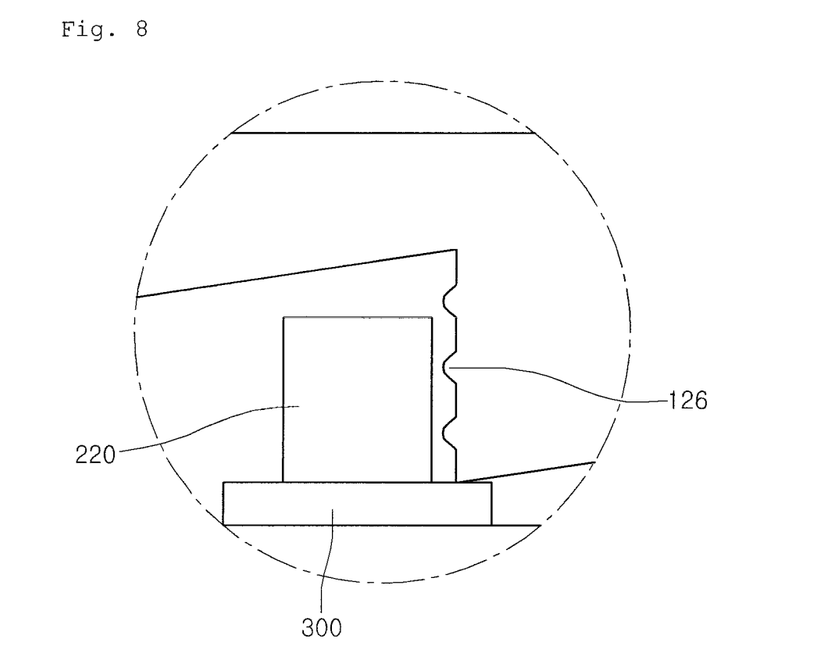

FIG. 1 is an exploded perspective view illustrating a liquid crystal display device according to an embodiment. FIG. 2 is a perspective view illustrating a back side of a light guide plate. FIG. 3 is a cross-sectional view of a liquid crystal display device according to an embodiment. FIG. 4 is a cross-sectional view magnifying part 'A' of FIG. 3. FIG. 5 is a cross-sectional view magnifying part 'B' of FIG. 3. FIG. 6 is a circuit view illustrating a driving unit. FIGS. 7 and 8 are cross-sectional views illustrating an incident surface according to another embodiment. FIGS. 9 through 12 are cross-sectional views a light guide unit according to another embodiment.

Referring to FIGS. 1 to 6, a liquid crystal display device may include a backlight unit 10, a liquid crystal panel 20, and a system 30.

The backlight unit 10 may generate light and may emit the light upwardly. The backlight unit 10 may be divided into a plurality of light emitting areas EA. The backlight unit 10 may control the intensity of emitted light for each light emitting area EA.

The backlight unit 10 may include light guide plates 100, light emitting diodes 200, printed circuit boards 300, and a reflection plate. Also, the liquid crystal display device may include a driving unit 500 for driving the light emitting diode 200.

The light guide plates 100 may receive light emitted from the light emitting diodes 200, and guide and emit the light upwardly by scattering, refraction, and reflection.

The light guide plates 100 may be coupled to each other to have one plate shape. Also, one light guide plate 100 may be disposed in the plurality of light emitting areas EA. For example, six light guide plates 100 may be coupled to each other to have one plate shape. In this embodiment, one light guide plate 100 is disposed in nine light emitting areas EA, but embodiments are not limited thereto. For example, the number and the shape of the light emitting areas EA may be variously modified.

The light guide plate 100 may include a plurality of light guide units that are formed in an integral manner. The light guide units may have a wedge shape.

For example, the light guide plate 100 may include a first light guide unit 110, a second light guide unit 120, and a third light guide unit 130. The first light guide unit 110, the second light guide unit 120, and the third light guide unit 130 may be formed in an integral manner.

The first light guide unit 110 may have a first upper surface 111, a first incident surface 112, and a first inclined surface 113.

The first upper surface 111 may face the liquid crystal panel 20. The first incident surface 112 may be extended in a direction crossing the first upper surface. More particularly, the first incident surface 112 may cross the first upper surface 111.

The first inclined surface 113 may be extended in a direction inclined from the first incident surface 112 to the first upper surface 111. That is, the first inclined surface 113 and the first incident surface 112 may cross each other. The first inclined surface 113 may face the first upper surface 111.

The second light guide unit 120 may be disposed at the side of the first light guide unit 110, and may be formed integrally with the first light guide unit 110. The second light guide unit 120 may have a second upper surface 121, a second incident surface 122, and a second inclined surface 123.

The second upper surface 121 may be disposed on the same plane as the first upper surface 111. The second incident surface 122 may be extended in a direction crossing the second upper surface 121 from the first inclined surface 113. More particularly, the second incident surface 122 may be downwardly extended from the first inclined surface 113.

The second inclined surface 123 may face the second upper surface 121. The second inclined surface 123 may be extended in a direction inclined from the second incident surface 122 to the second upper surface 121. The second inclined surface 123 may be upwardly and laterally extended from the second incident surface 122.

The third light guide 130 may be disposed at the side of the second light guide unit 120, and may be formed integrally with the second light guide unit 120. The third light guide unit 130 may have a third upper surface 131, a third incident surface 132, and a third inclined surface 133.

The third upper surface 131 may be disposed on the same plane as the first upper surface 111 and the second upper surface 121. That is, the first to third upper surfaces 111, 121 and 131 may be disposed on the same plane, and may constitute the upper surface of the light guide plate 100.

The third incident surface 132 may be downwardly extended from the second inclined surface 123. That is, the third incident surface 132 may be extended in a direction crossing the third upper surface 131.

The third inclined surface 133 may be upwardly and laterally extended from the third incident surface 132. That is, the third inclined surface 133 may face the third upper surface 131, and may be extended in a direction inclined to the third upper surface 131.

Referring to FIG. 4, prism patterns may be formed on the incident surfaces of the light guide plates 100. For example, prism patterns 124 may be formed on the first incident surface 112, the second incident surface 122, and the third incident surfaces 132.

The cross-section of the prism pattern 124 may be formed in a triangular shape, and may improve the incident efficiency of light emitted from the light emitting diodes 200.

Referring to FIG. 7, the prism pattern 125 may be formed on a portion of the incident surface.

Referring to FIG. 8, the prism pattern 126 may have a curved surface instead of an acute portion.

Referring to FIG. 5, a scattering pattern 134 may be printed on the inclined surface 133 or the undersurface of the light guide unit.

Figure 9:
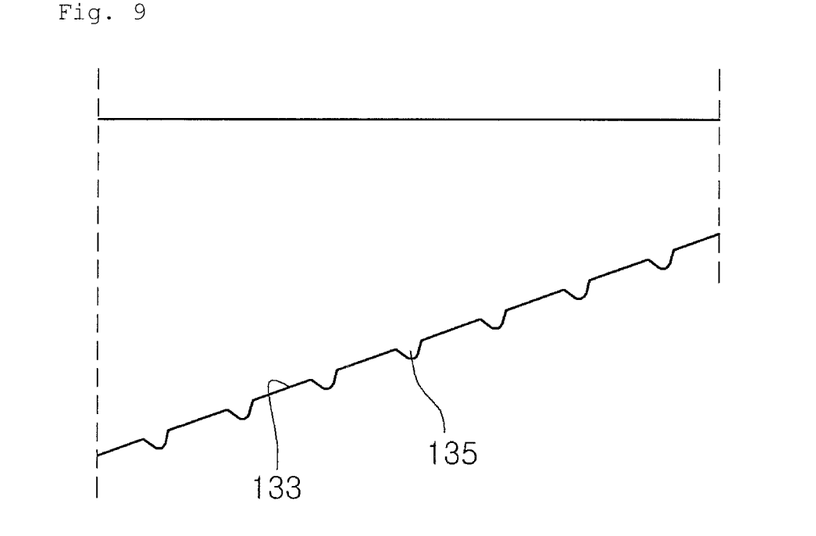
FIGS. 9 through 12 are cross-sectional views a light guide unit according to another embodiment.

Referring to FIG. 9, a scattering pattern 135 may be integrally formed on the inclined surface 133 or the undersurface of the light guide unit.

Figure 10:
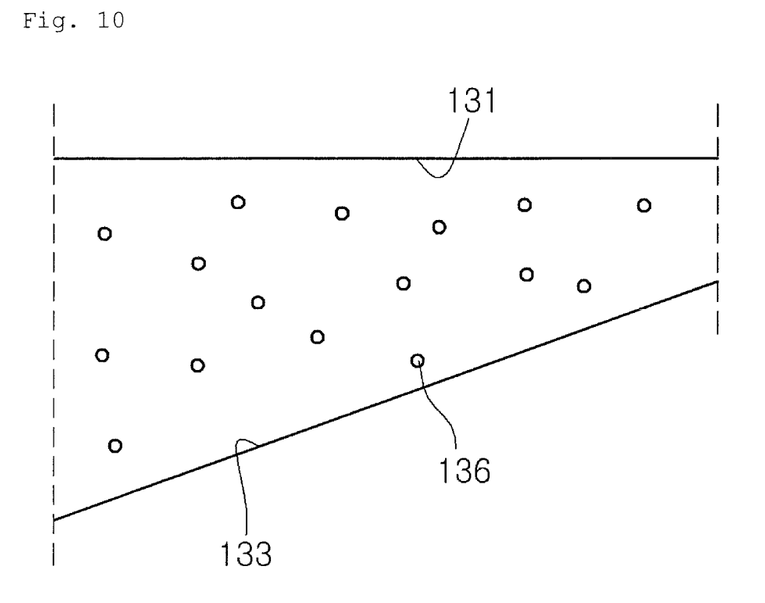

Referring to FIG. 10, a scattering pattern 136 may be disposed in the light guide unit.

Figure 11:
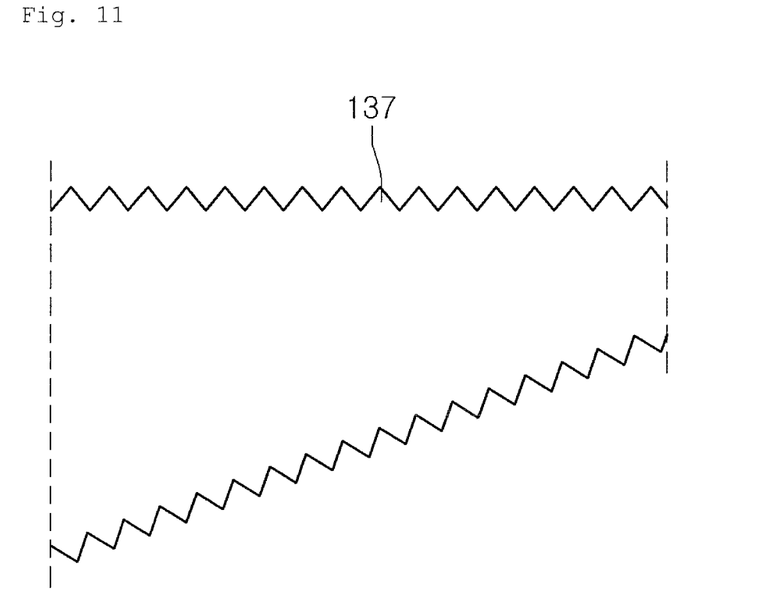

Referring to FIG. 11, a prism pattern 137 may be formed on the upper surface and the inclined surface of the light guide unit.

Figure 12:
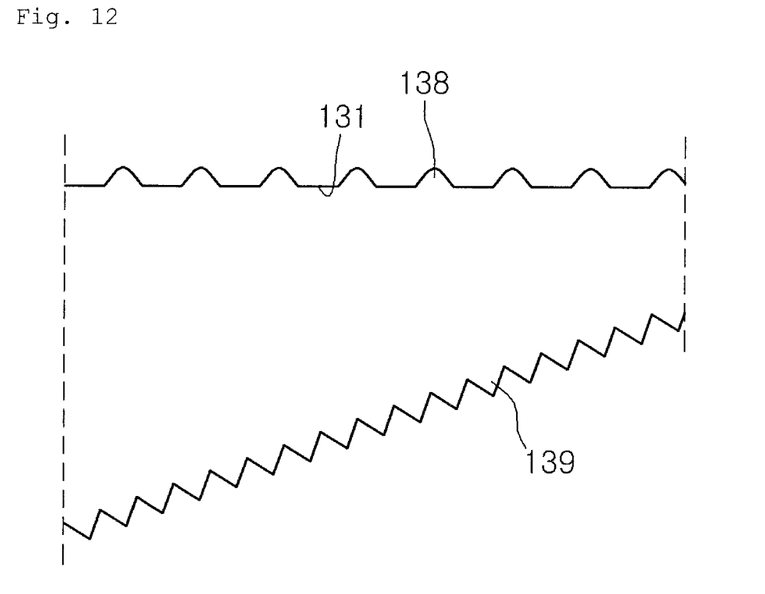

Referring to FIG. 12, a scattering pattern 138 may be formed on the upper surface 131 of the light guide unit, and a prism pattern 139 may be formed on the inclined surface of the light guide unit.

Examples of the materials used as the light guide plate 100 may include polymethylmethacrylate (PMMA), acrylonitrile styrene (AS), polystyrene (PS), polycarbonate (PC), polyethersulfone (PES), polyamide (PA), polyesterimide (PEI), and polymethylpentene (PMP).

The thickness of the light guide plate 100 may range from about 0.8 mm to about 1.3 mm, but embodiments are not limited thereto.

The light emitting diodes 200 may be disposed on the incident surface. For example, the first light emitting diode 210 may be disposed on the first incident surface 112, the second light emitting diode 220 may be disposed on the second incident surface 122, and the third light emitting diode 230 may be disposed on the third incident surface 132.

The light emitting diodes 200 may be disposed corresponding to the respective light emitting areas EA, and may be disposed in the respective light emitting areas EA one by one.

The light emitting diodes 200 may emit light toward the incident surface of the light guide units. For example, the first light emitting diode 210 may emit light toward the first incident surface 112. Similarly, the second and third light emitting diodes 220 and 230 may emit light to the second and third incident surfaces 122 and 132, respectively.

Also, the light emitting diodes 200 may emit light in the lateral direction. For example, the incident surfaces of the light guide units are parallel to each other, and all of the light emitting diodes 200 may emit light in the same direction. For example, the first to third incident surfaces 112, 122 and 132 may be parallel to one another. Also, the first to third light emitting diodes 230 may emit light in a direction parallel to the first to third upper surfaces 111, 121 and 131.

In contrast, the first to third light emitting diodes 210, 220 and 230 may emit light in a direction parallel to the first to third inclined surface 113, 123 and 133.

The printed circuit boards 300 may be disposed under the light emitting diodes 200. The printed circuit boards 300 may be mounted with the light emitting diodes 200. The printed circuit boards 300 may be electrically connected to the light emitting diodes 200, and may provide a signal for driving the light emitting diodes 200 to the light emitting diodes 200.

The printed circuit boards 300 may be extended in an alignment direction of the light emitting diodes 200. The print circuit boards 300 may be electrically connected to a driving unit 500 for driving the light emitting diode 200.

The reflection plate 400 may be disposed under the light guide plates 100. Also, the reflection plate 400 may reflect light generated from the light emitting diodes 200 in the upward direction.

The backlight unit 10 may further include optical sheets that are disposed on the light guide plates 100. The optical sheets can improve the characteristics of light passing through the optical sheets.

The driving unit 500 may drive the backlight unit 10. More particularly, the driving unit 500 may control the intensity of light emitted from the light emitting area EA, respectively. That is, the driving unit 500 may control the intensity of light emitted from light sources (for example, light emitting diodes) disposed in each light emitting diode 200.

The driving unit 500 may include an I/O interface 510, a controller 520, a DC/DC converter 530, and a current source 540.

The controller 520 may control driving voltage and driving current according to a brightness control signal applied from the system 30 through the I/O interface 510.

The DC/DC converter 530 may generate a voltage for driving the light emitting diodes 200 according to the driving voltage control of the controller 520.

The current source 540 may control the amount of the driving current flowing through the light emitting diodes 200 according to the driving current control of the controller 520.

The liquid crystal panel 20 may be disposed on the backlight unit 10. The liquid crystal panel 20 may control the intensity of the passing light by unit of pixel to display images.

The liquid crystal panel 20 may be divided into a plurality of display areas DA. The display areas DA may correspond to the light emitting areas, respectively. That is, the respective display areas DA may display images using light emitted from the corresponding light emitting areas EA.

The liquid crystal panel 20 may include a TFT substrate, a color filter substrate, polarized light filters and a liquid crystal layer between the two substrates. The liquid crystal panel 20 may change the path of the passing light using the liquid crystal layer, and thus may change the amount of light passing through the polarized light filters by unit of pixel.

The system 30 may drive the liquid crystal panel 20 and the backlight unit 10. The system 30 may include drivers for driving the liquid crystal panel 20 and a timing controller.

The system 30 may drive the liquid crystal panel 20 by RGB data and a data enable signal for driving the liquid crystal panel 20. The system 30 may drive the liquid crystal panel 20 for each display area DA.

That is, the system 30 may apply driving signals by unit of display area DA of the liquid crystal panel 20, respectively, and may drive the respective display areas DA individually.

The system 30 may control the brightness of the backlight unit 10 by unit of light emitting area EA. That is, the system 30 may apply a brightness control signal to the driving unit 500, and the driving unit 500 may control the brightness of the respective light emitting diodes 200, thereby controlling the brightness of the light emitting areas EA.

The system 30 may control the image and brightness of the display areas DA and the light emitting areas EA simultaneously, thereby displaying the image on the whole liquid crystal panel 20.

Accordingly, the system 30 may reduce the brightness of the display areas DA for displaying dark images to realize brilliant black.

Since the light emitting areas EA are individually driven, the liquid crystal display device according to the embodiment needs not to consume power to emit unnecessary light. Accordingly, the liquid crystal display device can reduce power consumption.

Since the light guide plate 100 is disposed in nine light emitting areas EA, dark portions that may be generated in the boundary between the light emitting areas EA can be reduced compared to the case where one light guide plate 100 is disposed in one light emitting area EA, respectively.

That is, the liquid crystal display device according to the embodiment can reduce brightness non-uniformity generated in the boundary between the light emitting areas EA.

Since the light guide units have a wedge shape, the amount of light incident to the light emitting areas EA adjacent to each other can be reduced.

The liquid crystal display device according to the embodiment may control an area of a connection portion to divide respective light emitting areas EA. Simultaneously, the liquid crystal display device can minimize a dark portion that may be generated between the light emitting areas EA when all of the light emitting areas EA emit light.

In this case, the light emitting areas located in the same light guide unit may be divided by the light emitting diodes 200. That is, since the light emitting diodes 200 emit light in a vertical direction with respect to an arrangement direction of the light emitting areas located in the same light guide unit, the light emitting areas located in the same light guide unit can be divided by the light emitting diodes 200.

The liquid crystal display device according to the embodiment can reduce a dark portion generated in the boundary between the light emitting areas EA to improve overall brightness.

Figure 13:
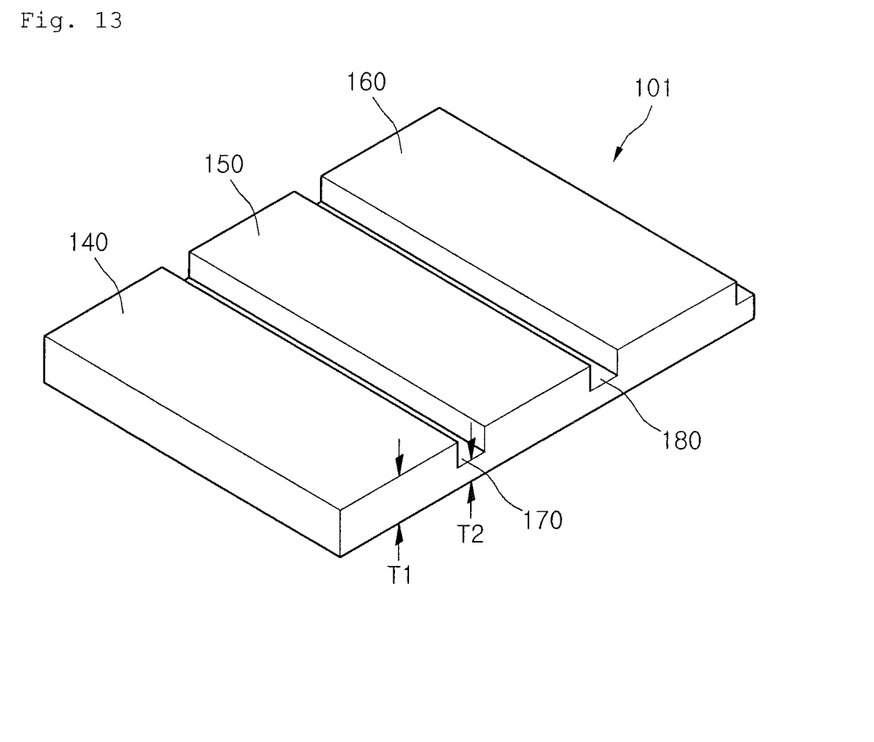
FIG. 13 is a perspective view illustrating a back side of a light guide plate according to another embodiment.
Figure 14:
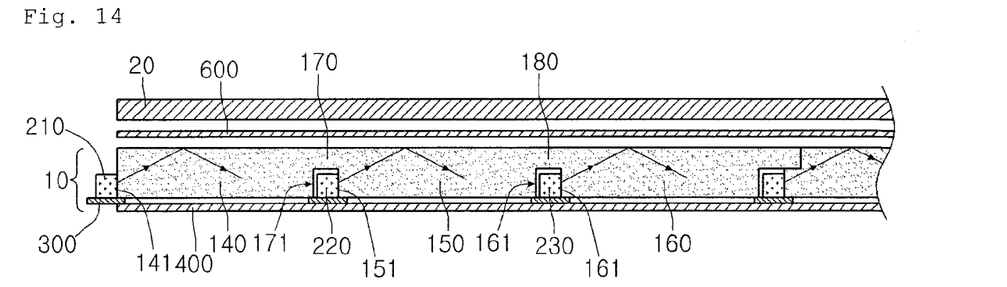
FIG. 14 is a cross-sectional view of a liquid crystal display device according to another embodiment.

FIG. 13 is a perspective view illustrating a back side of a light guide plate according to another embodiment. FIG. 14 is a cross-sectional view of a liquid crystal display device according to another embodiment. Hereinafter, detailed description of this embodiment will refer to those of the previous embodiments, and detailed description of a light guide plate will be additionally made below.

Referring to FIGS. 13 and 14, a plurality of grooves may be formed on the undersurface of a light guide plate 101, and light emitting diodes 200 may be disposed in the grooves. The light emitting diodes 200 may emit light toward one of the side surfaces of the grooves, respectively. That is, the respective side surfaces of the grooves of the light guide plate 101 become incident surfaces.

The light guide plate 101 may include a plurality of light guide units and connection portions. The connection portions may be disposed between the light guide units, and the light guide units and the connection portions are integrally formed.

The light guide units may have a plate shape, and the thickness of the connection portions may be smaller than the thickness of the light guide units. The thickness T1 of the light guide units may range from about 0.8 mm to about 1.2 mm, and the thickness T2 of the connection portions may range from about 0.4 mm to about 0.6 mm. The thickness of the light guide units may be determined according to the light emitting diode. Also, the light guide units may become thinner or thicker than the light emitting diode.

For example, the light guide plate 101 may include a first light guide unit 140, a second light guide unit 150, a third light guide unit 160, and first and second connection portions 170 and 180.

The first to third light guide units 140, 150 and 160 may have a plate shape. The side surface of the first light guide unit 140 may be the first incident surface 141, and the first light emitting diode 210 may be disposed on the first incident surface 141. The first light emitting diode 210 may emit light toward the first incident surface 141.

The side surface of the second light guide unit 150 may be the second incident surface 151, and the second light guide diode 220 may be disposed on the second incident surface 151. The side surface of the third light guide unit 160 may be the third incident surface 161, and the third light emitting diode 230 may be disposed on the third incident surface 161. The second light emitting diode 220 and the third light emitting diode 230 may emit light toward the second incident surface 122 and the third incident surface 132, respectively.

The first connection portion 170 may be disposed between the first light guide unit 140 and the second light guide unit 150. The first connection portion 170, the first light guide unit 140, and the second light guide unit 150 may be formed in an integral manner.

Since the thickness T2 of the first connection portion 170 is smaller than the thickness T1 of the first light guide unit 140 or the second light guide unit 150, a first groove 171 may be formed by the first connection portion 170, the first light guide unit 140, and the second light guide unit 150. The second light emitting diode 220 may be disposed in the first groove 171.

The second connection portion 180 may be disposed between the second light guide unit 150 and the third light guide unit 160, and the second connection portion 180, the second light guide unit 150, and the third light guide unit 160 may be integrally formed.

Since the thickness T2 of the second connection portion 180 is smaller than the thickness T1 of the second light guide unit 150 or the third light guide unit 160, a second groove 181 may be formed by the second connection portion 180, the second light guide unit 150, and the third light guide unit 160. The third light emitting diode 230 may be disposed in the second groove 181.

The liquid crystal display device according to the embodiment can be more easily manufactured due to a simple structure of the light guide plate 101. Also, since the light emitting diodes are disposed in the grooves, the light emitting diodes can be more easily fixed.

Since the undersurface of the light guide plate 101 is flat, an optical pattern such as scattering pattern or prism pattern may be more easily formed on the undersurface of the light guide plate 101.

Figure 15:
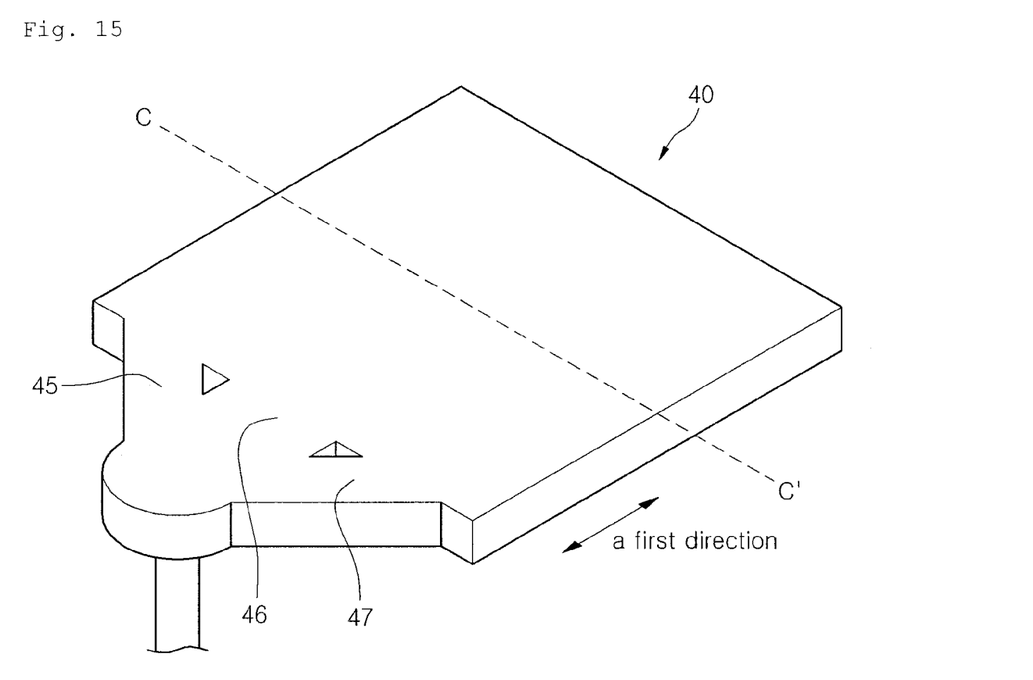
FIG. 15 is a perspective view illustrating a mold for manufacturing a light guide plate.
Figure 16:
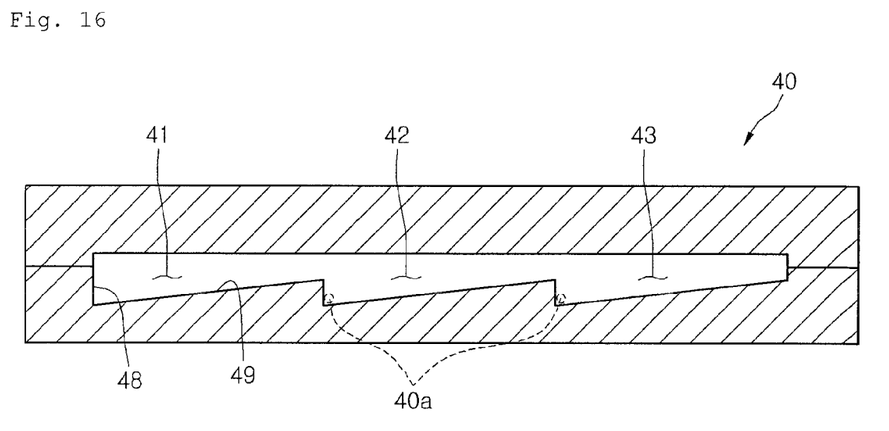
FIG. 16 is a cross-sectional view taken along line C-C' of FIG. 15.

FIG. 15 is a perspective view illustrating a mold for manufacturing a light guide plate. FIG. 16 is a cross-sectional view taken along line C-C' of FIG. 15.

Referring to FIGS. 15 and 16, a mold 40 may have a first injection molding groove 41, a second injection molding groove 42, and a third injection molding groove 43. The first injection molding groove 41, the second injection molding groove 42, and the third injection molding groove 43 may have a shape extending in the first direction.

The second injection molding groove 42 may be formed at the side of the first injection molding groove 41, and the third injection molding groove 43 may be formed at the side of the second injection molding groove 42.

The first injection molding groove 41 may be connected to the second injection molding groove 42, and the second injection molding groove 42 may be connected to the third injection molding groove 43.

The first injection molding groove 41, the second injection molding groove 42, and the third injection molding groove 43 may include inclined surfaces 49 declined with respect to the side surface 48.

The light guide plate may be formed by an injection molding or high-speed injection molding process. For example, in order to form the light guide plate, a resin composition may be injected into the mold 40. The resin composition may be injected in the first direction, and thus may be injected into the first injection molding groove 41, the second injection molding groove 42, and the third injection molding groove 43, respectively.

That is, a first injection portion 45, a second injection portion 45, and a third injection portion 47 may be connected to the mold 40 to inject the resin composition into the mold 40.

In this case, the resin composition may be directly injected into the first injection molding groove 41 through the first injection portion 45, and may be directly injected into the second injection molding groove 42 through the second injection portion 45. Also, the resin composition may be directly injected into the third injection molding groove 43 through the third injection portion 45.

The resin composition may be uniformly injected into the first to third injection portions 45, 46 and 47 through one inlet.

The resin composition may include a molten thermoplastic resin.

Thereafter, the injected resin composition may be cooled and hardened to form the light guide plate.

The resin composition may be injected in the first direction into the first injection molding groove 41, the second injection molding groove 42, and the third injection molding groove 43 through the first to third injection portions 45, 45 and 47, respectively. Accordingly, the resin composition may be injected even into the corner 40a of the mold 40, and the light guide plate may be very delicately formed.

That is, according to a method of fabricating a light guide plate according to an embodiment, the light guide plate having a complicated structure can be very delicately formed. Particularly, a light guide plate having a thickness of about 1 mm to about 2 mm can be easily manufactured.

Thus, the light guide plate shown in FIG. 2 can be manufactured.

Figure 17:
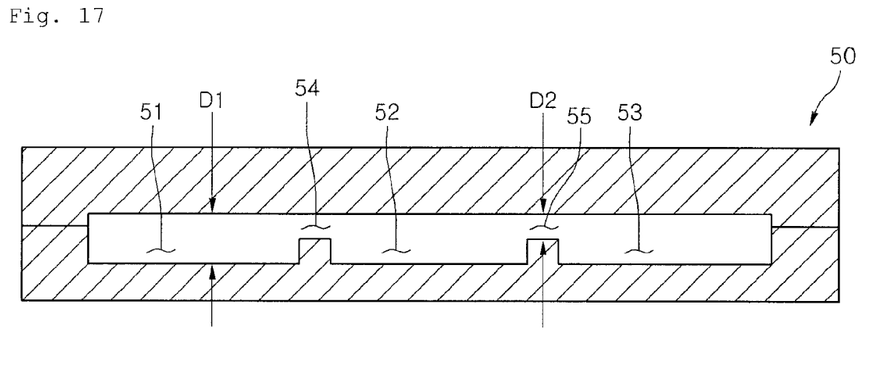
FIG. 17 is a cross-sectional view of a mold according to another embodiment.

FIG. 17 is a cross-sectional view of a mold according to another embodiment. Hereinafter, detailed description of this embodiment will refer to those of the previous embodiments, and detailed description of a light guide plate will be additionally made below.

Referring to FIG. 17, a first injection molding groove 51, a second injection molding groove 52, a third injection molding groove 53, a first connection region 54, and a second connection region 55 may be formed in a mold 50. The first connection region 54 may connect between the first injection molding groove 51 and the second injection molding groove 52, and the second connection region 55 may connect between the second injection molding groove 52 and the third injection molding groove 53.

The bottom surfaces of the first to third injection molding grooves 51 to 53 may be flat, and may cross the side surface thereof.

The depth D1 of the first to third injection molding grooves 51 to 53 may be greater than the depth D2 of the first and second connection regions 54 and 55.

Thus, the light guide plate of FIGS. 13 and 14 can be manufactured by the mold 50.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

A liquid crystal display device according to an embodiment is used in the field of a display.

The invention claimed is:

1. A liquid crystal display device comprising:
a liquid crystal panel having a plurality of display areas; and
a backlight unit under the liquid crystal panel, the backlight unit having a plurality of light emitting areas corresponding to each of the display areas and light sources corresponding to the respective light emitting areas; and
wherein the backlight unit comprises light guide plates disposed in two or more light emitting areas,
wherein the light guide plates comprise a plurality of light guide units having:
an upper surface facing the liquid crystal panel;
an incident surface extended in a direction crossing the upper surface;
an inclined surface extended from the incident surface in a direction inclined to the upper surface, and
a reflection plate disposed under the light guide plates, wherein the reflection plate is parallel to upper surfaces of the light guide plates,
wherein the light guide units are formed in an united body with each other, and
wherein the light sources are disposed on the reflection plate.

2. The liquid crystal display device according to claim 1, further comprising a driving unit for controlling intensity of light emitted from the light emitting areas.

3. The liquid crystal display device according to claim 1, wherein the light guide plates are coupled to each other.

4. The liquid crystal display device according to claim 1, wherein the backlight unit comprises a light source disposed in front of each of the incident surfaces.

5. The liquid crystal display device according to claim 1, wherein the light guide units have a wedge shape.

6. The liquid crystal display device according to claim 1, wherein the light sources emit light in a same direction towards the incident surfaces of the light guide units.

7. The liquid crystal display device according to claim 1, wherein a scattering pattern is formed on the inclined surface of each of the light guide units.

8. The liquid crystal display device according to claim 1, wherein the light guide units comprise a prism pattern formed at the upper surface; and the inclined surface.

9. The liquid crystal display device according to claim 1, wherein the light guide units comprise:
- a prism pattern formed at the inclined surface; and
- a scattering pattern formed at the upper surface.

10. A liquid crystal display device comprising:
- a liquid crystal panel;
- a plurality of light guide plates under the liquid crystal panel;
- a plurality of light sources for emitting light to the light guide plates;
- a reflection plate disposed under the light guide plates, wherein the reflection plate is parallel to upper surfaces of the light guide plates,
- wherein at least two of the light guide plates comprise a plurality of light guide units, the light guide units comprise incident surfaces to which the light emitted from the light sources is incident, and the light sources are disposed on the incident surfaces, and
- wherein the plurality of light sources are disposed on the reflection plate.

11. The liquid crystal display device according to claim 10, wherein an undersurface of each of the light guide plates comprises at least one of a prism pattern and a scattering pattern.

12. The liquid crystal display device according to claim 10, wherein each of the light guide plates having the light guide units comprises connection portions interposed between the light guide units, respectively, and the light guide units and the connection portions are integrally formed.

13. The liquid crystal display device according to claim 12, wherein a thickness of the connection portions is smaller than a thickness of the light guide units.

14. The liquid crystal display device according to claim 10, wherein a number of the light guide units per light guide plate is equal to or more than three.

15. A liquid crystal display device comprising:
- a liquid crystal panel;
- a plurality of light guide plates under the liquid crystal panel;
- a plurality of light sources for emitting light to the light guide plates;
- a reflection plate disposed under the light guide plates, wherein the reflection plate is parallel to upper surfaces of the light guide plates,
- wherein at least two of the light guide plates comprise:
  - a plurality of light guide units; and
  - a plurality of connection portions respectively disposed between the light guide units,
  - wherein the light sources are disposed between the light guide units, and
  - wherein the plurality of light sources contact the reflection plate.

16. The liquid crystal display device according to claim 15, the light guide units are integrally formed with the connection portions.

17. The liquid crystal display device according to claim 15, wherein a thickness of the connection portions is smaller than a thickness of the light guide units.

18. The liquid crystal display device according to claim 15, wherein each of the light guide units comprise:
- an upper surface facing the liquid crystal panel;
- a bottom surface facing the upper surface; and
- an incident surface extending from the bottom surface.

19. The liquid crystal display device according to claim 18, wherein the light sources emit light to the incident surface of each of the light guide units.

* * * * *